United States Patent [19]

Clark

[11] 4,435,707
[45] Mar. 6, 1984

[54] WEATHER RADAR WITH SIGNAL COMPENSATION FOR PRECIPITATION

[75] Inventor: John F. Clark, Princeton, N.J.

[73] Assignee: Sperry Corporation, New York, N.Y.

[21] Appl. No.: 241,782

[22] Filed: Mar. 9, 1981

[51] Int. Cl.³ .......................................... G01S 13/95
[52] U.S. Cl. ............................. 343/5 W; 343/5 SM
[58] Field of Search ......................... 343/5 SM, 5 W

[56] References Cited

U.S. PATENT DOCUMENTS

| | | | |
|---|---|---|---|
| 2,736,020 | 2/1956 | Atlas | 343/5 W X |
| 3,525,095 | 8/1970 | Cordry | 343/5 W X |
| 3,781,878 | 12/1973 | Kirkpatrick | 343/5 W |
| 4,213,126 | 7/1980 | Mulder et al. | 343/5 SM |
| 4,270,127 | 5/1981 | Clark, Jr. | 343/5 W |

Primary Examiner—T. H. Tubbesing
Attorney, Agent, or Firm—Howard P. Terry

[57] ABSTRACT

A weather radar incorporating a sensitivity time control modifying circuit for adaptively increasing the gain of the IF amplifier as a function of precipitation rate; thereby increasing the range of the radar through the precipitation and identifying on the display those regions in which the radar might otherwise inaccurately indicate the precipitation rate. Reflections from the precipitation are received by the radar antenna coupled to a mixer wherefrom an IF signal is coupled to the IF amplifier wherein it is amplified in accordance with a gain that is determined by the modified sensitivity time control signal.

3 Claims, 6 Drawing Figures

WEATHER RADAR WITH SIGNAL COMPENSATION FOR PRECIPITATION

The present invention is concerned with weather radar systems and more particularly with such systems which compensate for signal attenuation due to intervening precipitation.

All commercially available weather radar systems produce, and via a pivotable antenna transmit, periodic signal pulses at successive azimuths. In response to each transmitted pulse, precipitation in the path of the signal pulse, if any, causes echo signals at the transmitted frequency (ignoring Doppler shift) to be reflected back to the radar system. It is well known that, absent any intervening precipitation, an echo signal reflected back to the radar system from a relatively distant area of precipitation of given rate, will be of lower amplitude than an echo signal reflected from a relative close area of precipitation of the same given rate. Therefore, all weather radar systems employ a circuit, generally referred by the acronym STC (for Sensitivity Time Control), which corrects the gain of the radar system receiving amplifier as a function of time following each transmitted pulse. As a result, distant precipitation or close precipitation of equal intensity will cause the radar receiver amplifier to produce the same level output signal.

The most popular airborne weather radar frequencies are at X band (9345 MHz) and at C band (5400 MHz). Even with STC, such weather radars are subject to attenuation caused by intervening precipitation which may affect the displayed accuracy of precipitation relatively distant from the aircraft. Attenuation of the transmitted signal and the reflected return signal is due to scattering and absorption by the intervening precipitation. Thus, for example, if close to the aircraft there is a storm cloud producing precipitation at high rate and further away along the same azimuth from the aircraft there is a second storm cloud also producing precipitation at high rate, the first (closer) precipitation or at least part thereof closest to the radar will be properly indicated on the aircraft radar display screen. The second (more distant) precipitation region may not be accurately indicated. Therefore, all presently available airborne weather radar systems are designed to be used only for weather avoidance purposes.

Pilots properly trained in the use of weather radar systems are aware of the inaccurate indication of more distant rainfall and are trained to avoid penetrating a severe storm as displayed on the radar for lack of knowledge as to what lies beyond.

Nevertheless, it is desirable to have precipitation displayed accurately as to rate. It is particularly important to mark clearly those radar-mapped areas within which the radar system is incapable of displaying the precipitation rate accurately.

U.S. Pat. No. 2,736,020, issued Feb. 21, 1956 to David Atlas for ARAC-Automatic Rain Attenuation Correction, describes a weather radar which utilized "a plurality of gain channels" to separate each storm encountered along a given radial into several (e.g., three) broad precipitation intensity levels ("light, moderate, and heavy"). In effect, a new gain channel was required each instant the rain intensity increased or decreased across a boundary between two precipitation levels, or between zero and light precipitation. This invention was never used commercially.

In the late 1960's a rather different rain attenuation correction (RAC) circuit appeared briefly on a commercial airborne weather system. Its intended function was to modify the gain of the radar system receiving amplifier to compensate for attenuation due to rainfall. However, this RAC analog circuit was inherently regenerative, and depended on close control of loop gain for stability. In practice, the RAC circuit was also difficult to calibrate initially, and failed to maintain its gain over time to the required close tolerance. The RAC feature was quickly dropped from subsequent models of the radar system.

The present invention requires only a single amplifier, is inherently stable (non-regenerative), and utilizes digital techniques to maintain calibration to the required close gain tolerance over time.

Figures 1A, 2:
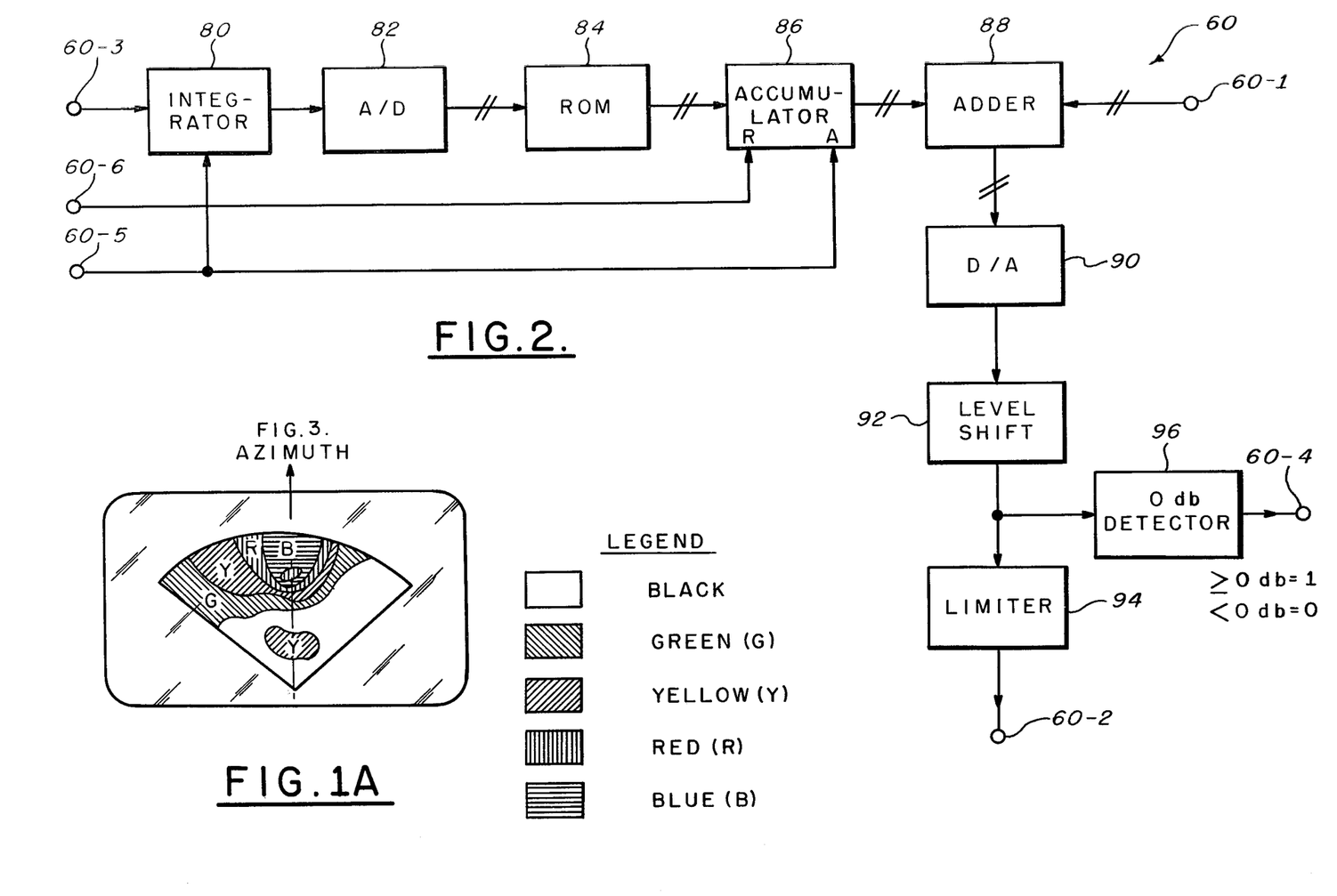
FIG. 1A is an exemplary display on the display screen of a weather radar system.
FIG. 2 is a preferred embodiment of a circuit for compensating the FIG. 1 radar received signal for precipitation attenuation in block and logic diagram form in accordance with the present invention.
Figure 1B:
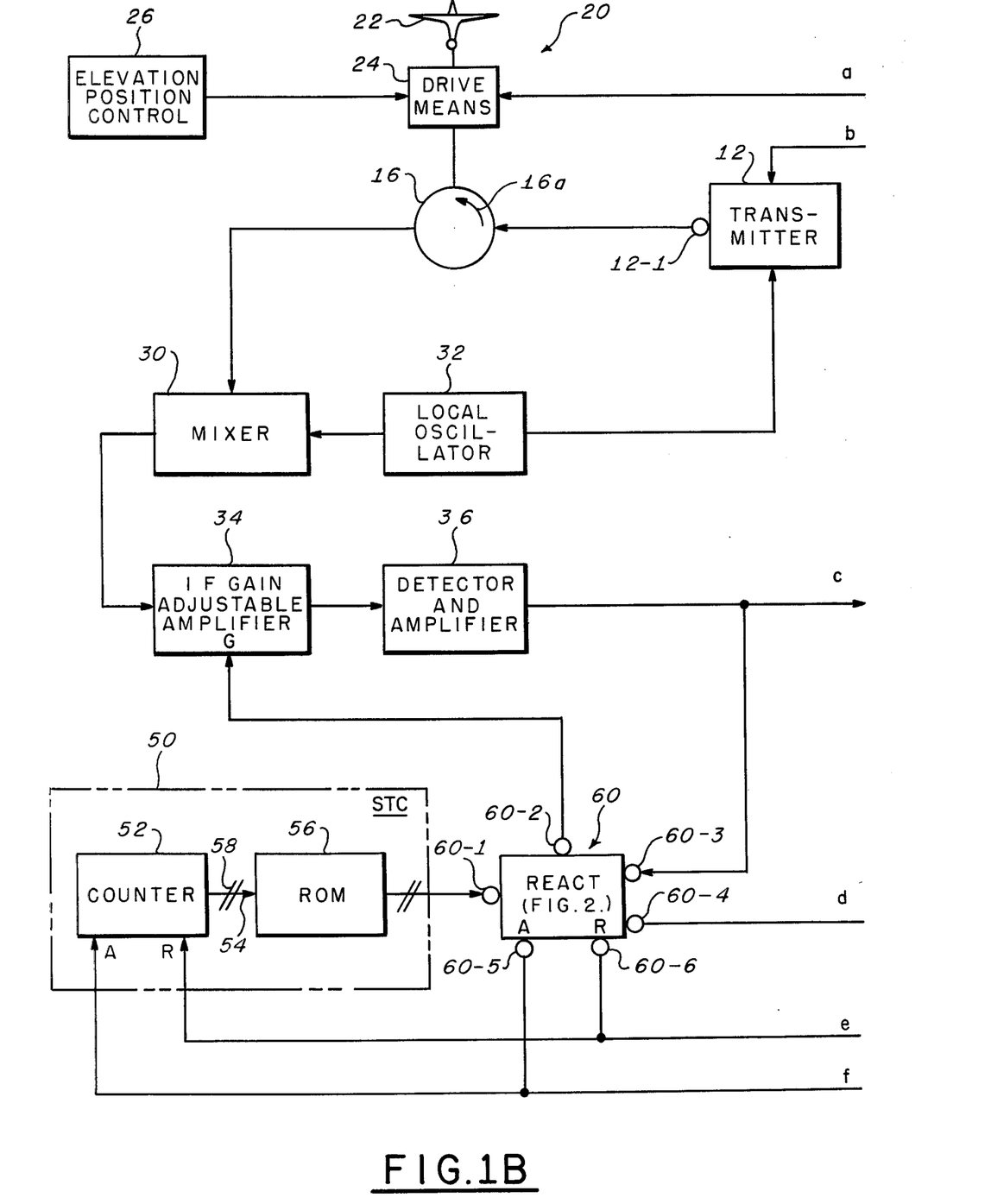
FIGS. 1B and 1C, which for convenience hereafter be referred to as FIG. 1, show a weather radar system in block diagram form incorporating a circuit for compensating the received radar signal for precipitation attenuation in accordance with the present invention.
Figure 1C:
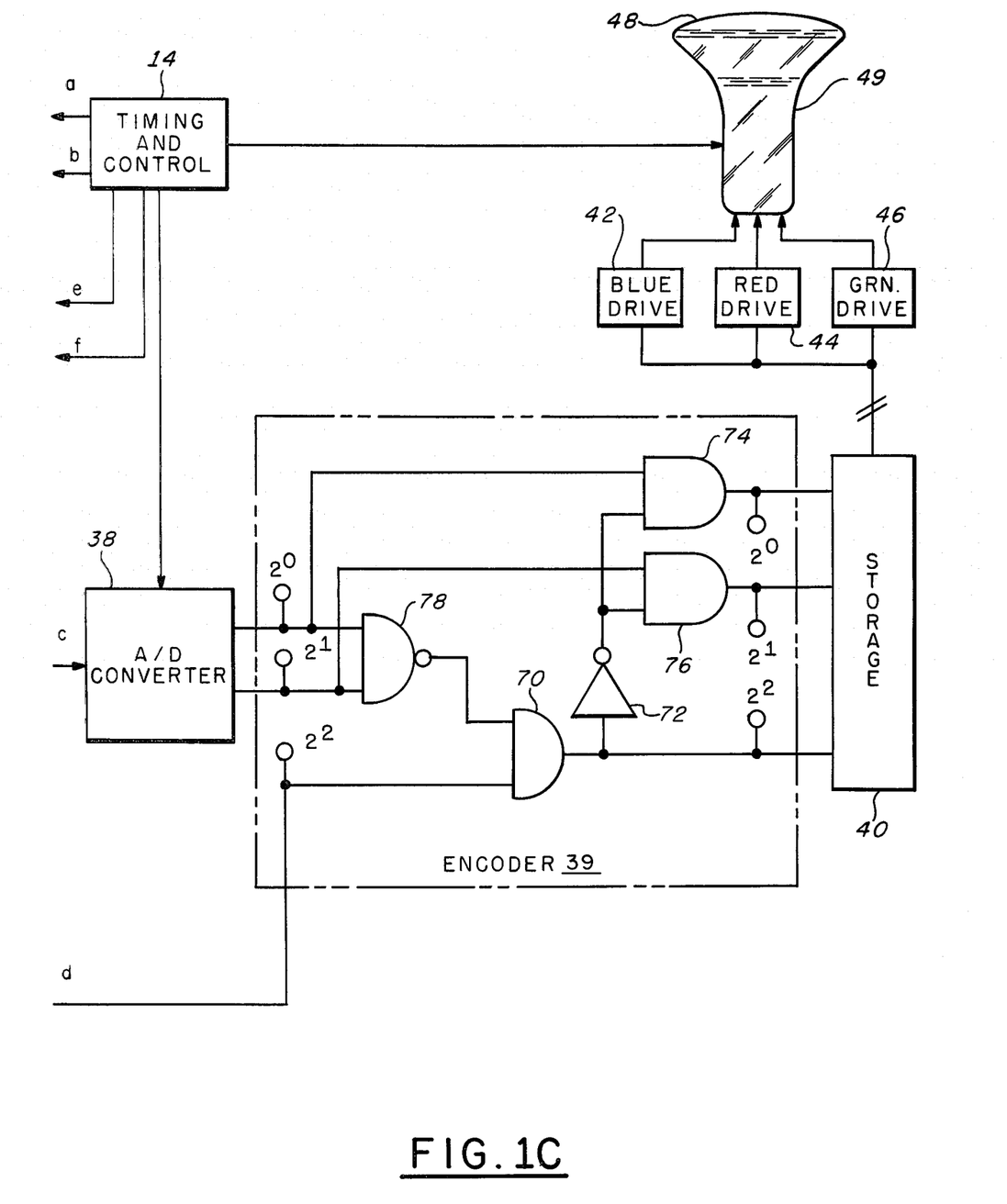

In FIG. 1, to which attention is now directed, with the exception of encoder 39 and REACT circuit 60 there is illustrated a typical airborne weather system with digital data storage and color presentation. Typically all the equipment illustrated in FIG. 1 is mounted in an aircraft (not shown) although it equally well could be a ground based station.

In FIG. 1, a transmitter 12, which may be of the type employing a magnetron tube or solid state components, under control of a suitable timing and control circuit (T/C) 14, produces periodic signal pulses of relatively short duration and of appropriate frequency (e.g., 9345 or 5400 MHz). T/C 14 is the master timing and control for the system of FIG. 1 and typically comprises a stable frequency source and a plurality of frequency dividing circuits to produce pulses at desired times as described hereinafter. The output of transmitter 12 is coupled to one port of a conventional three-port circulator 16 for passing signal pulses therethrough in the direction of arrow 16a to the next succeeding port thereof.

A transmitting and receiving antenna means 20, such as a conventional flat plate or parabolic reflector antenna, is coupled to the next port of circulator 16. Antenna means 20 is typically mounted in the nose of a multiengine aircraft (not shown) or in the wing of a single engine aircraft (not shown). The antenna means comprises a reflector portion 22 for both transmitting signal pulses produced by transmitter 12 and receiving reflected signals from atmospheric precipitation. Antenna means 20 also comprises a mechanical or electronic drive means 24 for pivoting reflector portion 22. T/C 14 is coupled to drive means 24 to control the movement and position of reflector 22. In conventional fashion, reflector 22 is pivoted by drive means 24, a small angular amount in azimuth prior to the transmission of each signal pulse therefrom to, thereby, as a function of time, "sweep" a sector of desired angle and range directly in front of the antenna and therefore generally in front of the aircraft (e.g., within ±80° of the aircraft heading) in which the system of FIG. 1 is mounted.

Conventionally, antenna means 20 also includes means 26 for elevationally positioning reflector 22. Means 26 may be a manually operated knob or may include gyro or electronic equipment for ensuring that reflector 22 is elevationally positioned to avoid receiving reflection from terrain when the radar is adjusted to receive and display precipitation information.

Circulator 16 is also coupled to a subtractive mixer 30 to route thereto reflected echo signals received by antenna reflector 22. A local oscillator 32 is also coupled to mixer 30 to provide a reference frequency signal which is a given frequency separation from that produced by transmitter 12. Transmitter 12 and local oscillator 32 may be coupled to maintain the given separation.

Mixer 30 of conventional design produces an output intermediate frequency (IF) signal at the difference of the two input frequencies when both are present. The output of mixer 30 is coupled to an IF adjustable gain amplifier 34 which has a gain control terminal G. Amplifier 34 is coupled to a conventional detector and video amplifier (D&A) 36 typically capable of operation at frequencies of up to a megahertz. D&A 36 demodulates the intermediate frequency carrier from the signal applied thereto and produces an amplified video signal, the amplitude of which as a function of time represents precipitation levels, if any, at successive distances in front of antenna 22 in the direction the antenna is pointing.

In a typical radar system featuring a digital display, which is of the type illustrated in FIG. 1, a signal from D&A 36 up to some given relatively low amplitude is defined to correspond to no precipitation; a signal of amplitude greater than the given low value and up to some given intermediate value is defined to correspond to a light precipitation rate; a signal of amplitude greater than said intermediate value and less than some relatively high value, is defined to correspond to an intermediate precipitation rate; while a signal in excess of the relatively high given value is defined to correspond to a heavy precipitation rate. The intermediate and heavy precipitation are both to be avoided by pilots under ordinary circumstances because of their potential association with severe turbulence. D&A 36 is coupled to an analog-to-digital converter (A/D) 38 which produces a succession of two-bit binary signals corresponding to the amplitude of the analog signal produced by D&A 36 at a succession of times which represent digitally as a function of time and therefore of distance, precipitation conditions in front of reflector 22. One such A/D 38 which is suited for the application is disclosed in U.S. Pat. No. 4,189,714 issued Feb. 19, 1980 to K. C. Adam which is assigned to the common assignee and is incorporated by reference herein.

Conventionally, A/D 38 is coupled to a suitable storage means 40. However, in accordance with the invention, an encoder 39, to be described in detail hereinafter, is coupled between A/D 38 and storage means 40. A suitable storage means is a random access memory which stores in various locations therein, information concerning precipitation conditions for a desired distance in front of antenna 22 over a desired sector. The addressing hardware for storage means 40 is not illustrated in FIG. 1. Exemplary addressing hardware is illustrated and claimed in U.S. Pat. No. 4,106,021 issued Aug. 8, 1978 to K. Katagi which is assigned to the common assignee and is incorporated by reference herein.

In a color type radar system, as illustrated in FIG. 1, storage means 40 is coupled to a conventional blue, red and green drive means 42,44, and 46, respectively for intensity modulating display screen 48 of a suitable display drive such as CRT 49 having blue, red and green inputs to which the drive means are coupled.

In a monochromatic type radar, means 40 is typically connected to a digital-to-analog converter (not shown) which converts binary signals stored in means 40 into equivalent analog signals. The converter is coupled to the intensity modulation terminal of a monochromatic CRT 49 to be driven by the analog signal. An exemplary display pattern on screen 48 is illustrated in FIG. 1A where various levels of shading correspond to either various intensity levels in a monochromatic system or various colors in a color system. The various monochromatic intensities or colors represent various levels of precipitation. T/C 14 is coupled to display CRT 49 to provide suitable timing signals thereto to display weather information in raster scan fashion on screen 48. A suitable display and signal processing circuits therefore is described in U.S. Pat. No. 4,127,873 issued Nov. 28, 1978 to K. Katagi which is assigned to the common assignee and incorporated by reference herein.

Conventionally, a suitable sensitivity time control circuit (STC) 50 receives timing signals from T/C 14 and is conventionally coupled to the gain terminal (G) of amplifier 34 (through a connection not shown). In a conventional weather radar system STC 50 produces an analog signal which abruptly decreases the amplifier gain before and during the transmitter pulse. Thereafter, the analog signal increases the amplifier gain at the controlled rate of 6 dB per octave of elapsed time from the transmitter pulse, out to the beam filling range, and 12 dB per octave thereafter. As known to those skilled in the art, the beam filling range is that range at which a spherical cloud three miles in diameter just fills the signal beam width (between 3dB points) of antenna means 20. The signal as a function of time following the transmission of each pulse by antenna reflector 22, compensates for signal attenuation due to distance from antenna 22. The STC signal terminates when amplifier 34 is operating at full gain (i.e., no attenuation).

Figure 3A:
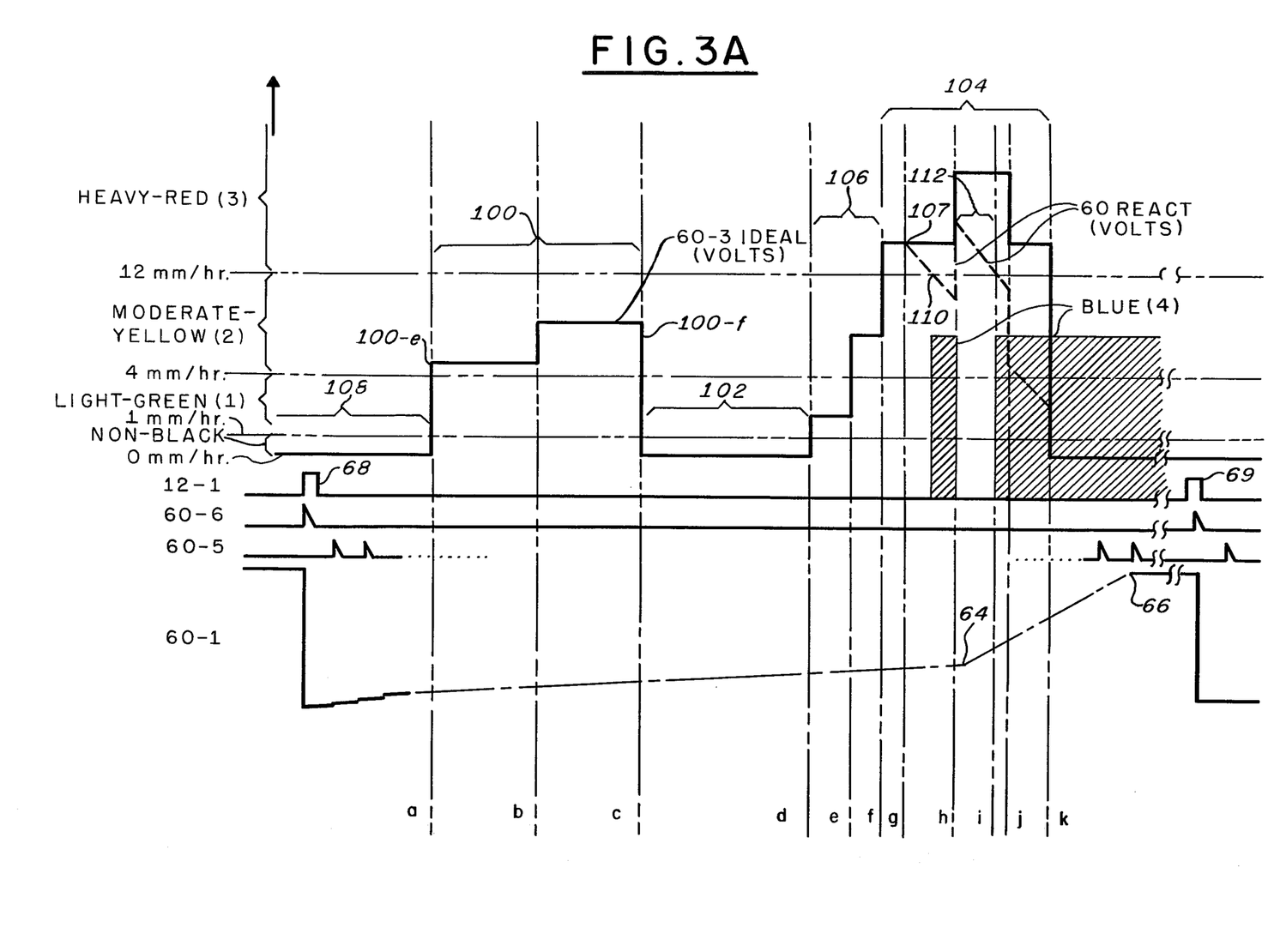
FIGS. 3A and 3B, which for convenience hereafter will be referred to as FIG. 3, show a set of waveforms useful in understanding the operation of FIGS. 1 and 2.
Figure 3B:
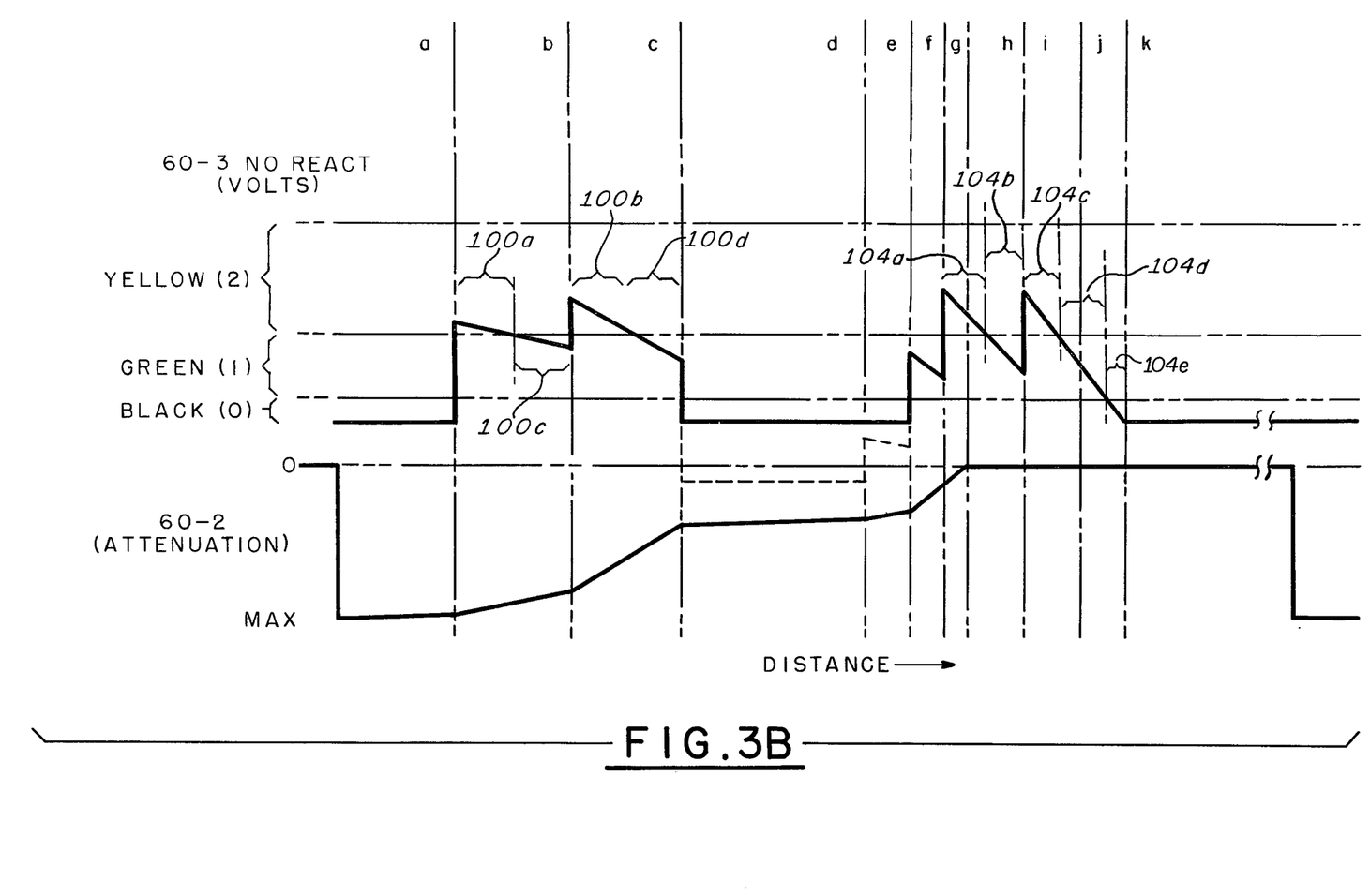

Referring momentarily to FIG. 3, waveform 60-1 illustrates the STC output signal in dB as a function of time following each transmitted pulse as illustrated in waveform 12-1. The signal extends to point 66 at which it is at 0 dB and therefore amplifier 34 is operating at full gain. As previously stated, the signal produced by STC 50 is intended to compensate for radio-frequency (r.f.) signal attenuation due to distance. That is, an r.f. pulse transmitted by antenna reflector 22 is attenuated in amplitude as it travels from antenna 22 and is reflected back to antenra 22 from a rain cloud (not shown) if any. The STC signal is not intended for and cannot compensate for attenuation due to the transmitted signal passing through a rain cloud. In accordance with long established tradition in the weather radar community, the STC waveform has an abrupt slope change at point 64, at a time corresponding to the "beam filling" distance. To the left of point 64 as illustrated in FIG. 3, the beam will illuminate a lesser portion of the given three-mile cloud. At distances beyond point 64, the transmitted beam will illuminate the entire cloud and also will illuminate non-precipitation areas on either side of the cloud from which no reflection can be received. In accordance with convention, the STC waveform changes at the rate of 6 dB per octave to the left of point 64 and 12 dB per octave to the right of point 64.

Returning to FIG. 1, in accordance with the instant invention, STC 50 produces digitally changing signals rather than the analog signals normally produced by an STC. Thus, STC 50 comprises a counter 52 connected by a multiple conductor cable 54 to the address inputs of read only memory ROM 56. A cross hatch such as 58 indicates a multiconductor cable. T/C 14 is connected to the reset (R) and advance (A) terminals of counter 52. T/C 14 produces a reset pulse concurrent with each transmit pulse (waveform 12-1) and produces a series of equal time-spaced pulses, each of which advances counter 52 by a count of one. By way of example, in a time interval corresponding to a pulse roundtrip distance of 50 nautical miles T/C 14 produces 200 advance pulses. ROM 56 utilizes the counter outputs for addressing purposes and produces binary signals, the digital values of which as a function of time correspond to the values of waveform 60-1.

ROM 56 is coupled to terminal 60-1 of a circuit 60, with the acronym REACT (for Rain Echo Attenuation Compensation Technique). REACT 60 has an output terminal 60-2 coupled to the G terminal of amplifier 34 and receives timing signals from T/C 14 at its A&R terminals and video signals from D&A 36 at terminal 60-3. REACT circuit 60 will be discussed in detail in connection with FIG. 2. Briefly, REACT circuit 60 decreases the amount of attenuation of amplifier 34 caused by the signal from STC 50, thereby increasing the gain of amplifier 34 as a function of time above that produced by STC 50, to compensate for cumulative attenuation of the radar signal due to passing through precipitation. Along each azimuth, at that range (if any) at which there is no longer any attenuation of amplifier 34 gain, the REACT circuit 60 produces a signal at terminal 60-4 which causes the display 44 to indicate that the radar is uncalibrated for the remainder of that azimuthal scan.

The 60-4 output from REACT 60 is connected to the $2^2$ input of encoder 39 and to a first input of an AND gate 70, while the output of AND gate 70 is connected to a logic inverter 72. Logic inverter 72 is connected to one input of each of AND gates 74, 76. The $2^0$ and $2^1$ outputs of A/D 38 are connected to second inputs of AND gates 74 and 76, respectively, and to respective inputs of NAND gate 78. The output of NAND gate 78 is connected to the second input of AND gate 70. AND gate 74 is connected to the $2^0$ output of encoder 39. AND gate 76 is connected to the $2^1$ output of encoder 39.

Table 1 is the truth table for encoder 39 and additionally lists the display screen 48 colors for various output values of encoder 39.

TABLE 1

| INPUT | | | OUTPUT | | | |
|---|---|---|---|---|---|---|
| $2^2$ | $2^1$ | $2^0$ | $2^2$ | $2^1$ | $2^0$ | DRIVE |
| 0 | 0 | 0 | 0 | 0 | 0 | BLACK |
| 0 | 0 | 1 | 0 | 0 | 1 | GREEN |
| 0 | 1 | 0 | 0 | 1 | 0 | YELLOW |
| 0 | 1 | 1 | 0 | 1 | 1 | RED |
| 1 | 0 | 0 | 1 | 0 | 0 | BLUE |
| 1 | 0 | 1 | 1 | 0 | 0 | BLUE |
| 1 | 1 | 0 | 1 | 0 | 0 | BLUE |
| 1 | 1 | 1 | 0 | 1 | 1 | RED |

It will be noted from Table 1, that when the input $2^2$ signal is a logic 0, corresponding to amplifier 34 not being at full gain, all the encoder 39 output logic levels correspond to the respective input logic levels.

However, when the input $2^2$ signal is a logic 1 corresponding to amplifier 34 operating at full gain and the $2^1$ and/or $2^0$ output logic levels are zero, corresponding to the black, green, or yellow precipitation level, the $2^2$ logic 1 signal is transmitted to storage 40 which, in a manner ultimately to be described, is displayed on color radar screen 48 in blue. The last entry in Table 1, in which $2^2$, $2^1$, and $2^0$ are logic 1, corresponds to a heavy precipitation rate which is accurately stored in means 40 and later accurately displayed on screen 48, in effect giving priority to the specific precipitation rate color of red over the unknown "blue for blind."

In FIG. 2, to which attention is now directed, REACT 60 of FIG. 1 is illustrated in detail.

Terminal 60-3 is coupled to an integrating circuit 80 for integrating the video signal produced by D&A 36, FIG. 1. Terminal 60-5 is coupled to integrator 80 to provide periodic advance signals thereto from T/C 14. The integrator effectively averages signals representative of the amount of precipitation, if any, between pulses applied at terminal 60-5.

Integrator 80 is coupled to A/D 82 which produces a digital signal equivalent to the analog signal produced by integrator 80, which signal corresponds to the amount of precipitation as indicated by D&A 36, FIG. 1. Converter 82 is typically a 6-bit 64-level converter.

A/D 82 is coupled to the addressing input of a ROM 84. An exemplary ROM stores 64 values corresponding to the attenuation of 63 rainfall rates and "no rain". At a particular transmitter 12 frequency there are known formulas computing radar signal attenuation per unit distance as a function of precipitation. For example, in accordance with a formula determined by Batten, L. J., *Radar Meterology*, University of Chicago Press, Chicago, Ill. 1959, at X band precipitation attenuation in dB/km is equal to $2.9 \times 10^{-4} Z^{0.72}$ where the reflectivity $Z = 200 r^{1.6} mm^6/m^3$ (the Marshall-Palmer relation), where r is the rainfall rate in mm/hr. The round-trip (two-way) attenuation is twice this value. ROM 84 is therefore factory programmed with 63 values of round-trip attenuation corresponding to successively higher rates of rainfall ranging from an arbitrarily low value such as 0.3 mm/hr., to a high rate such as 200 mm/hr. or more, plus a zero value corresponding to less than 0.3 mm/hr. of rainfall. The programmed values are arrayed in geometric progression in Z (equal logarithmic increments of $dBZ = 10 \log Z$). Accumulator 86 adds the value of signal produced by ROM 84 to the value stored in the accumulator 86 as each pulse is received at the A terminal thereof. Accumulator 86 therefore contains a value corresponding to the total round-trip precipitation attenuation occurring in front of antenna 20 since the reset pulse was received from terminal 60-6. It will be recalled that the signal produced at terminal 60-6 occurs concurrently with the transmit pulse produced by transmitter 12, FIG. 1.

The output of accumulator 86 is coupled to a digital adder 88 which is also coupled to terminal 60-1. Adder 88 thus adds the signal produced by STC 50 at terminal 60-1 to the signal corresponding to precipitation attenuation, if any, produced by accumulator 86. The output of adder 88 is coupled to a D/A 90. D/A 90 produces an analog signal corresponding to the binary signal applied thereto. D/A 90 is coupled to a level shifting circuit 92 which in turn is coupled to a limiter circuit 94 and to a 0 dB detector 96. Limiter 94 is coupled to terminal 60-2 which is connected to the G terminal of amplifier 34. Detector 96 produces a binary signal at terminal 60-4. As will be explained more fully hereinafter, detector 96 produces a logic 1 signal whenever the amplifier 34, FIG. 1, is operating at full gain. Otherwise, when amplifier 34 is operating at less than full gain, detector 96 produces a logic 0 signal. The purpose of limiter 94 is to insure that the signal produced at terminal 60-2 cannot rise above the value required for amplifier 34 to operate at full gain.

Operation of the circuit of FIG. 1 will now be described. Reference as appropriate will be made to FIG. 3, which illustrates waveforms at various terminals in FIG. 1. The first waveform at the top of FIG. 3 illustrates, as a function of time, assumed precipitation rates at successive distances in front of antenna reflector 22 in the direction in which the antenna beam is pointed. That waveform also represents the signal at terminal 60-3 in volts (with appropriate choice of vertical scale) resulting from the precipitation under ideal conditions with the circuitry of FIG. 1, all as will be explained in detail hereinafter.

Assume that transmitter 12 produces a repetitive r.f. pulse 68, as illustrated in FIG. 3, waveform 12-1, of given frequency and given fixed amplitude, which is transmitted into the atmosphere by antenna reflector 22 into and through the various precipitation regions of intensities represented by the waveform at the top of FIG. 3. As the pulse impinges upon precipitation such as that indicated by region 100, FIG. 3, some energy will be reflected back as an echo signal to antenna reflector 22 from successive points in the precipitation. Some energy will pass through the precipitation in the direction that pulse 68 was transmitted to impinge on further precipitation and some will be absorbed by the water droplets or scattered in various other directions and thus never be reflected to reflector 22. The reflected energy will, as a function of time determined by the distance of the precipitation from antenna 22, be returned to antenna 22, and applied to mixer 30 where it is mixed with the signal from local oscillator 32. The reflected signal is attenuated both due to distance it has travelled and due to the scattering and absorption by the precipitation. For purposes of initial discussion such losses will be ignored. The intermediate frequency is amplified by amplifier 34 by an amount determined by the signal (to be hereinafter described) applied to the G terminal.

The signal produced by amplifier 34 is demodulated by detector 36 and amplified by a given fixed amount producing the waveform in volts at the top of FIG. 3, captioned 60-3 (IDEAL) which is identical in shape to the assumed rainfall rate. The analog signal produced by D&A 36 is then quantified according to amplitude by two bit A/D 38 into a series of binary numbers each equivalent to one of four decimal values where, as indicated at the left side of the top waveform of FIG. 3, 0 corresponds to 0–1 mm/hr. rainfall; 1 corresponds to 1–4 mm/hr.; 2 corresponds to 4–12 mm/hr. rainfall; and 3 corresponds to more than 12 mm/hr. By way of example, if it is desired to display weather conditions 50 nautical miles in front of antenna 22, A/D 38, under control of T/C 14, produces 200 successive digital signals at times corresponding to the signal returns from successive one-fourth nautical mile increments. The digital signals are passed through encoder 39 and stored in appropriate addresses in storage means 40 at locations corresponding to the angular position of reflector 22 as controlled by an addressing apparatus as disclosed in the aforementioned U.S. Pat. No. 4,106,020. It is being initially assumed that the REACT circuit is not operational. Therefore, terminal 60-4 is assumed to produce a logic 0 and in accordance with Table 1 encoder 39 is transparent to signals passed therethrough.

After the digital signals resulting from the transmission of pulse 68 have been received and stored in storage means 40, a signal from T/C 14 is applied to antenna drive 24 to pivot antenna reflector 22 to a new angular position. Thereafter, transmitter 12 produces a new pulse 69 at terminal 12-1 thereof (see FIG. 3) and the process above-described is repeated. Typically, antenna 20 covers a 120° to 180° sector in approximately one-half degree increments. Also typically, return data from four successive antenna azimuth positions is combined and entered as one stream of data into storage means 40.

Concurrent with, but substantially independent of the storage of digital signals into storage means 40, the signals are taken out at the required refresh rate of display 49.

The display on screen 48 is in raster scan format. The binary coded signals stored in storage means 40 are converted into color levels by the blue, red, and green drives 42, 44, and 46, respectively. By way of some examples and with reference to the waveform at the top of FIG. 3, under ideal conditions the two-level moderate precipitation area 100 will be translated into a series of decimal 2's, each represented by the binary value 10 (the first bit is the most significant), and stored in storage means 40 in binary form. The precipitation is then displayed in yellow on screen 48. Similarly, area 102 of no precipitation will be stored as a series of binary signals each of value 00 and displayed in black (no light) on screen 48, while heavy precipitation area 104 will be stored as a series of signals each of digital value 3, or binary value 11 [$(3)_{10} = (11)_2$], and displayed in red.

The system described to this point is based on the assumption that the signal pulses transmitted by antenna 20 are not attenuated by distance or by transmission through intervening precipitation. In actuality, attenuation due to both causes occurs. In the prior art, attenuation due to distance has been traditionally compensated by an STC circuit which produces an analog signal to reduce the attenuation of amplifier 34 (and therefore increase its gain) as a function of time and therefore distance following transmission of each pulse by transmitter 12.

In accordance with the invention, STC 50, FIG. 1 produces at terminal 60-1, as illustrated in FIG. 3, waveform 60-1, a digitally generated signal. STC 50 operates as follows. Concurrent with the transmission of a pulse from transmitter 12, T/C 14 produces a reset pulse as illustrated in FIG. 3, waveform 60-6 to reset counter 52, FIG. 1. The counter is thereafter periodically advanced by advance pulses from T/C 14 as illustrated in FIG. 3, waveform 60-5. It will be realized that none of the waveforms in FIG. 3 are accurate either as to abscissa or ordinate. In particular, the period of pulses illustrated in waveform 60-5 in reality is much less than illustrated. The exemplary period of the advance signal produced by T/C 14 is 3.1 microseconds corresponding to a round-trip signal distance of 0.25 nautical miles. The changing values in counter 52 as a function of time, address associated addresses in ROM 56 which produces at terminal 60-1 as a function of time, a digital signal of increasing value and having a break in its slope at point 64 (waveform 60-1, FIG. 3). With reference to FIG. 2 and assuming momentarily that components 80, 82, 84 and 86 are not operative, the signal produced by ROM 56 at terminal 60-1 is simply passed through adder 88 and converted to an analog signal by D/A 90. The signal is then converted by level shifter 92 to the type signal required by amplifier 34, FIG. 1 to cause the amplifier to provide maximum attenuation upon the transmission of each pulse by antenna 20 and then become attenuated less and less with increasing time until the amplifier reaches zero attenuation (full gain) at a time corresponding to point 66, FIG. 3, waveform 60-1. Thus, STC 50 compensates for attenuation due to the geometrical spreading of the transmitted energy with distance (6 dB/octave to beam-filling range, 12 dB/octave beyond). Precipitation signals received after point 66 (but before 69) may be displayed on screen 48 at a value less than their true intensity.

A further extension of the STC in a digital manner, is accomplished by circuitry described and claimed in the aforementioned U.S. Pat. No. 4,189,714.

As previously mentioned, STC 50 will not compensate for return signals additionally attenuated due to signal passage through precipitation.

Thus, in the absence of REACT circuit 60, FIG. 1, precipitation as illustrated at the top of FIG. 3, with a properly operating STC circuit, will cause waveform 60-3 (no REACT) to be produced from D&A 36. Comparison of FIG. 3, waveform 60-3 (no REACT) with waveform 60-3 (IDEAL) will show substantial differences. For example, whereas region 100 is illustrated as all moderate rainfall and would be displayed on screen 48 in the yellow color, in accordance with waveform 60-3 (no REACT) only regions 100-a and 100-b will be displayed in yellow; regions 100-c and 100-d will be displayed in green erroneously indicating only light rainfall. Moreover, although region 104 is all of heavy rainfall, in accordance with waveform 60-3 (no REACT) regions 104-a and 104-c will be displayed as yellow, 104-b and 104-d in green and 104-e as black, grossly understating the heavy rainfall which is in actuality occurring.

In accordance with the invention, REACT circuit 60 of FIG. 1 compensates for attenuation due to signal passage through precipitation. REACT operates as follows. In region 108 of the top waveform of FIG. 3, there is no precipitation. Thus, D&A 36 produces no signal and accumulator 86, FIG. 2, reset by a pulse at terminal 60-6 remains reset and thus does not add to the STC signal produced at terminal 60-1. In region 100 there is moderate precipitation which causes an echo signal to be returned to antenna reflector 22. At the leading edge 100-e, thereof, D&A 36 produces a signal accurately reflecting the moderate rainfall rate. For a time between successive pulses at terminal 60-5 that signal is integrated by integrator 80 to remove noise and is digitized by A/D 82 into one of 63 values by way of example. The digital value produced by A/D 82 is used to address ROM 84 at a location which contains a digital value corresponding to the signal attenuation per unit distance expected at the rainfall rate indicated by the signal value from A/D 82. When the next pulse is received at the A terminal of accumulator 86, the accumulator adds the value produced by ROM 84 to any previous value stored in the accumulator which in the present example is 0. A value contained in accumulator 86 represents the expected attenuation of the reflected signal due to two-way passage through the first increment of precipitation area 100, FIG. 3, of distance corresponding to the space between pulses of waveform 60-5, FIG. 3.

Adder 88 adds the precipitation attenuation compensation signal stored in accumulator 86 to the distance attenuation compensation signal at terminal 60-1 from STC 50, FIG. 1. The resulting signal is converted to an analog signal and level shifted as needed and applied to amplifier 34 to increase its gain so as to just compensate for the return signal attenuation due to both distance (STC) and precipitation (REACT).

The procedure described is repeated at each pulse of waveform 60-5, FIG. 3 during the time the return signals from precipitation region 100, FIG. 3, are received so that the value in accumulator 86 continues to increase. During the time corresponding to region 102 of no precipitation (i.e., less than 0.3 mm/hr.), no signal is received by antenna reflector 22 and therefore no signal is produced by D&A 36. Thus, accumulator 36 continues to store and provide to adder 88 the signal value it attained at the trailing edge 100-f of precipitation region 100. As return signals from precipitation area 106, FIG. 3, are received accumulator 86 once again continues to accumulate values corresponding to the attenuation due to the precipitation.

At point 107 in the precipitation, it will be assumed that the signal produced at terminal 60-2, FIG. 2, is such that amplifier 34 (FIG. 1) is just beginning to operate at full gain. Said another way, the gain of amplifier 34 is attenuated by 0 dB. Therefore, 0 dB detector 96, FIG. 2, produces at terminal 60-4 a logic 1 signal and continues to do so long as amplifier 34 is operated at full gain; that is, until the next transmitter 12 pulse 69.

In the example of precipitation given in FIG. 3, there is heavy precipitation at point 107. To the right of point 107, the rapid signal attenuation due to the heavy precipitation cannot be further compensated by increasing the gain of amplifier 34. Therefore, as indicated by the dashed lines denoting the signal produced by D&A 36, the signal decreases rapidly with time (or distance) such that at point 110, the signal goes sufficiently low in value so that A/D 38 produces a digital 10 signal $[(10)_2 = (2)_{10}]$ erroneously, indicating moderate rather than heavy precipitation. Therefore, encoder 39 in accordance with Table 1 causes the series of $2^2$ level 1 signals to be entered into storage means 40 which will ultimately be displayed in accordance with the procedure above-described on screen 48 as a blue area which indicates to the pilot that the radar is, at and beyond that distance, not calibrated. It will be noted at this time, that accumulator 86 will continue to accumulate the erroneously low signals produced by D&A 36 which will indeed be added in adder 88 and converted to an analog signal by D/A 90. However, the limiter 94, will prevent the signal produced at terminal 60-2 from going above the signal which causes amplifier 34 to operate at full gain.

If as illustrated in FIG. 3, in region 112 at a greater range the rainfall is sufficiently heavy that even with attenuation, the signal from D&A 36 is at a level to cause A/D 38 to provide a level 3 (red) signal, that value will be entered into storage means 40 in accordance with Table 1.

Assuming that the rainfall pattern illustrated at the top of FIG. 3, extends for a considerable distance in a direction normal to the direction of flight of the aircraft (not shown) which contains the radar of FIG. 1, FIG. 1A depicts the appearance of radar screen 48.

It will be understood that the interval between pulses of the signal produced at terminal 60-5, is so short that even with returns from heavy storms the attenuation between these pulses is very low and therefore each adjustment in gain of amplifier 34 is correspondingly small. In the prior art system which contained the equivalent of an adjustable amplifier 34 to compensate for attenuation, the gain was adjusted in a continuous, analog fashion, causing the system to be inherently regenerative and therefore unstable.

In contrast, the digital system hereinbefore described adjusts the gain of amplifier 34 in a series of small, discrete, equally-spaced (in time) steps. Since the output of D/A 36 is integrated by integrator 80 only between these discrete steps. This digital system is inherently non-regenerative and therefore stable.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. In a weather radar of the type including a sensitivity time control (STC) circuit coupled to an IF amplifier in a receiver which in turn is coupled to an antenna for receiving pulses reflected from precipitation in the path of pulses radiated from the antenna, the STC for providing a signal as a function of time to vary the gain of the IF amplifier and an analog-to-digital (A/D) converter coupled between the IF amplifier and an addressable memory having an output coupled to a display device, the improvement comprising:

means coupled to receive amplified siganls from said IF amplifier for integrating said amplified signals over a preselected time interval to obtain an integrated signal value and provide a signal representative of said integrated signal value after said time interval has expired;

summing means coupled to receive said signal representative of said integrated signal at said expiration of said time interval and to receive said STC signal at a time substantially in coincidence with said expiration time for providing a signal at an output terminal representative of a sum of said integrated signal value and said STC signal, said sum representative signal coupled to cause said IF amplifier to exhibit a variable gain in accordance therewith; and means coupled between said summing means output terminal and said IF amplifier for limiting variable gain control signals coupled to said IF amplifier to levels that insure that said IF amplifier operates at gains that are no greater than a preselected maximum.

2. A weather radar in accordance with claim 1 further including means having first input means coupled to said A/D converter, second input means coupled to said summing means, and output means coupled to said addressable memory for providing addressing signals to said addressable memory, said addressing signals being output signals from said A/D converter when said sum representative signal is below a predetermined level and modified therefrom when said sum representative signal is above said predetermined level.

3. A weather radar in accordance with claim 2 wherein said A/D converter has first and second output terminals for providing a two bit output signal, thus having four possible digital output signals (0,0; 0,1; 1,0; 1,1) and said summing means provides a one bit output signal, thus having two possible digital output signals 0 and 1, said digital signals causing said address means to address said memory in accordance with a truth table as follows:

| SUM MEANS | A/D | ADDRESS |
|---|---|---|
| 0 | 0 0 | 0 0 0 |
| 0 | 0 1 | 0 0 1 |
| 0 | 1 0 | 0 1 0 |
| 0 | 1 1 | 0 1 1 |
| 1 | 0 0 | 1 0 0 |
| 1 | 0 1 | 1 0 0 |
| 1 | 1 0 | 1 0 0 |
| 1 | 1 1 | 0 1 1 |

* * * * *